Figure 5:
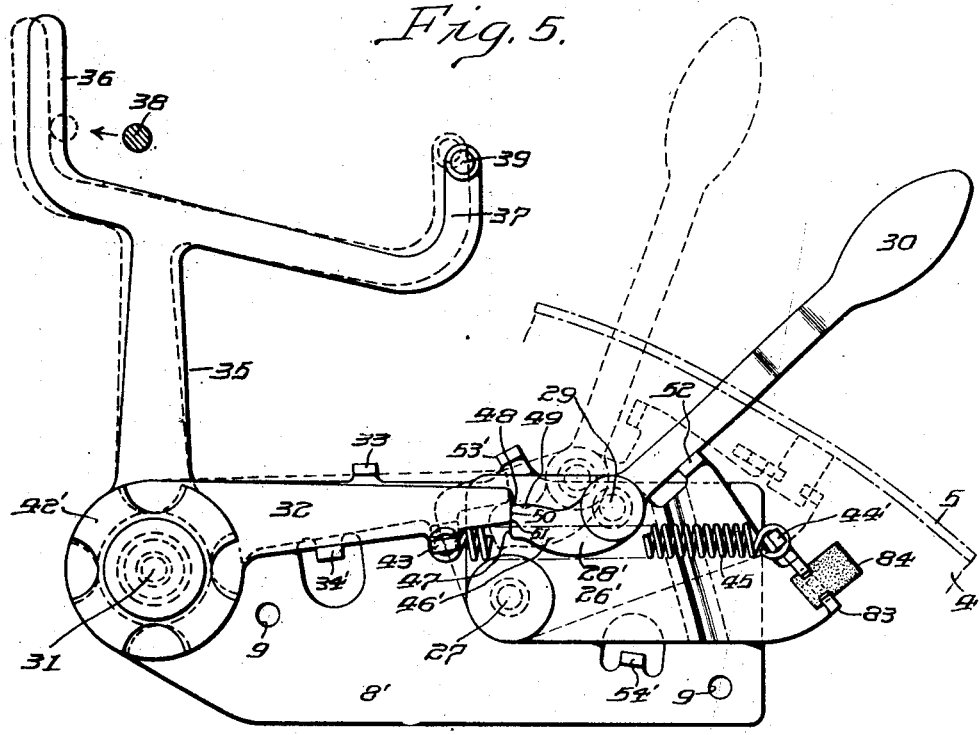

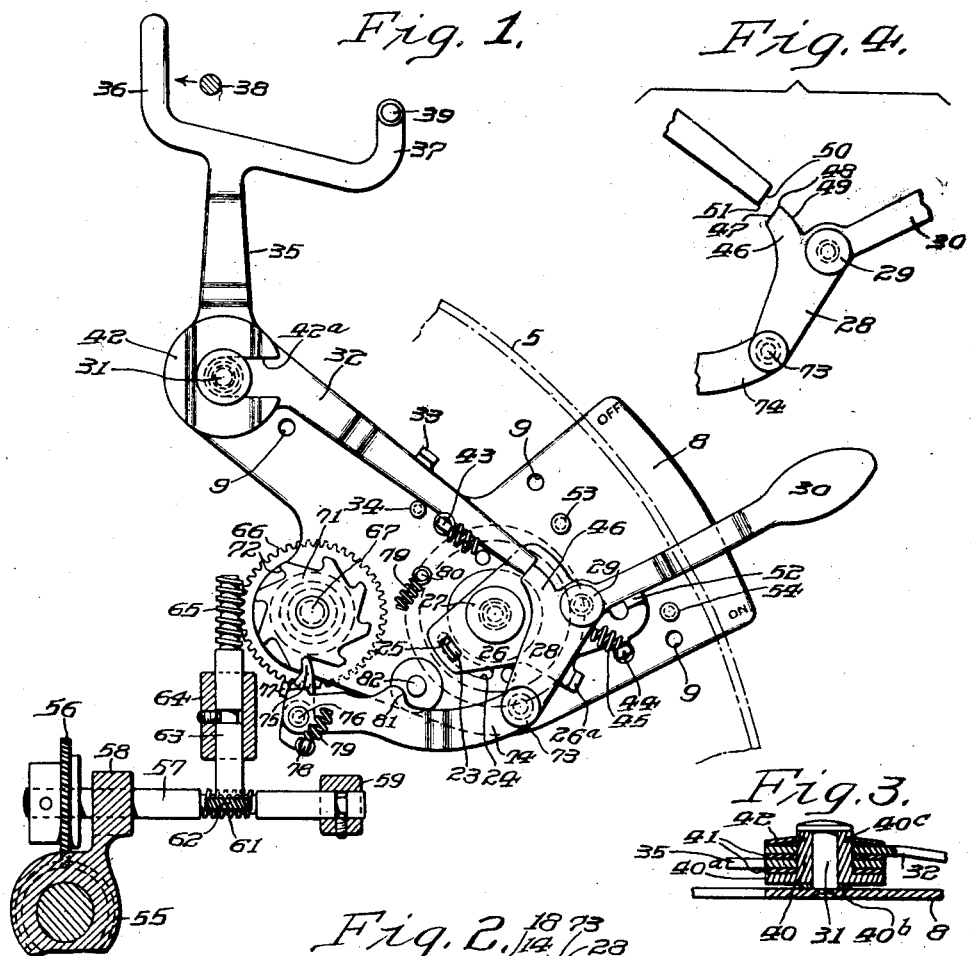

Dec. 2, 1924.

F. S. CALDERWOOD ET AL 1,517,401

STOPPING MECHANISM

Filed Aug. 26, 1922     2 Sheets-Sheet 2

WITNESS
F. J. Hartman.

INVENTORS
Frederic S. Calderwood,
Rudolph E. Zeruneith.
BY
Blum, Moulton & Helbert
ATTORNEYS

Patented Dec. 2, 1924.

1,517,401

UNITED STATES PATENT OFFICE.

FREDERIC S. CALDERWOOD, OF RIVERTON, NEW JERSEY, AND RUDOLPH E. ZERU-NEITH, OF PHILADELPHIA, PENNSYLVANIA, ASSIGNORS TO VICTOR TALKING MACHINE COMPANY, A CORPORATION OF NEW JERSEY.

STOPPING MECHANISM.

Application filed August 26, 1922. Serial No. 584,405.

*To all whom it may concern:*

Be it known that we, FREDERIC S. CALDERWOOD, a citizen of the United States, and a resident of Riverton, in the county of Burlington, State of New Jersey, and RUDOLPH E. ZERUNEITH, a citizen of the United States, and a resident of the city of Philadelphia, in the county of Philadelphia and State of Pennsylvania, have invented certain new and useful Improvements in Stopping Mechanisms, of which the following is a specification.

Our invention relates to stopping mechanisms and more particularly to those devices by the operation of which a talking machine mechanism is stopped either manually or automatically, or manually and automatically at such times or places as it may be found desirable so to do.

In those talking machines wherein a spring motor is employed to rotate the turntable the stopping of the machine is usually effected by manually or automatically applying a brake to the periphery of the turntable or to a flange depending therefrom, or to any other appropriate part of the motor. There are, however, other talking machines in which the electric motor, mounted directly on the turntable spindle or geared thereto, is used to rotate the turntable, and in those machines the mere application of a brake to the turntable or to the motor to stop the further operation thereof would injure, or tend to injure, the electric motor. In such machines, therefore, the usual way of stopping the rotation of the turntable is to cut off the electric current to the electric motor by opening an electric switch in the motor current.

Our invention is arranged and adapted to perform either or both of these functions, and the term "stopping mechanism" as employed herein refers to a mechanism operative to apply a brake to some part of the machine to stop the continued rotation thereof, or to break an electric current, by which the driving motor is driven; and the term "stop member" as employed by us herein applies to that member which, when released or otherwise moved, either automatically or manually, is connected to and moves a brake against some moving part of the talking machine to stop the rotation of the motor, or moves an electric switch in such a manner as to break the circuit which includes an electric motor, operative to drive the machine.

We have therefore shown and described two forms or embodiments of our invention, one operating as a switch throwing mechanism and the other operating as a brake mechanism.

The objects of our invention are to provide a stopping mechanism, of the character above indicated, which may be easily and accurately set to operate automatically at an exact predetermined point, preferably at or near the end of the sound record groove; to provide a stopping mechanism which is delicate, and which is actuated upon the application of a relatively light pressure; to provide a structure wherein the releasing parts of the stopping mechanism are subjected to substantially no wear, so that the release of the stop member, at exactly the desired point, is readily accomplished, and so that there is no wear on the setting or resetting mechanism tending to vary the time when the device will operate to stop the machine.

Further objects of our invention are to provide a structure wherein the stop member may be released by hand without jamming or wearing the surfaces which cooperate to effect the automatic operation of the device and whereby the means for manually releasing the stopping member may be operated in the reverse direction to reset the device; to provide a handle, for manually operating the stop mechanism and for resetting the same, which is provided with an abutment which engages the detent of an automatic releasing mechanism so that said abutment is readily moved by the handle in one direction out of engagement with said detent to actuate the stopping mechanism and whereby said abutment is moved in the opposite direction by said handle to bring said abutment into engagement with the end of said detent.

Other objects of our invention will appear in the specification and claims below.

In the drawings forming a part of this specification and in which the same reference characters are employed throughout the various views to designate the same parts, Fig. 1 is a plan view of one embodiment of our invention, the device being one in which the stopping of the talking machine is effected by a breaking of an electric current supplied to the motor (not shown) for turning the turntable spindle; Fig. 2 is a side elevational view of the structure shown in Fig. 1, the motor board on which the automatic stopping mechanism is mounted and the electric switch being shown in vertical cross-section; and Fig. 3 is a vertical sectional view of the frictional connection between the detent and the adjustable arm. Fig. 4 is a further detail of construction, showing the coacting surfaces of the detent and abutment member, and the parts slightly separated.

Figure 6:
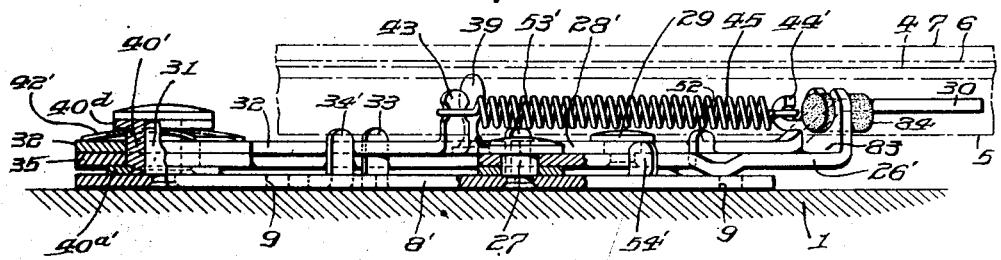

Fig. 5 is a plan view of a modified form of our device wherein the stopping of the talking machine is effected by the application of a friction brake to the flange of the turntable; and Fig. 6 is a side elevational view of the structure shown in Fig. 5, certain parts thereof being shown in vertical cross-section.

Referring first to the embodiment of our invention shown in Figs. 1 to 4, the motor board 1 is suitably provided with a hole or opening 2 through which upwardly passes a turntable spindle 3, on the upper end of which is carried a turntable 4 having downwardly depending peripheral flange 5 and a top frictional surface 6, preferably of felt or similar material. It is upon this friction surface 6 that the record 7 lies as it is being rotated by the turntable under the reproducer or sound box (not shown). The base plate 8 may be of any suitable shape. It is preferably stamped from flat sheet metal. It is preferably provided with suitable holes 9 through which screws may be passed for the purpose of rigidly securing it to the top of the motor board 1.

From the underside of the base plate 8 depends a small electric switch 10, the casing 10′ of which is rigidly secured to the base plate 8. This electric switch 10 may be and preferably is of any appropriate construction and preferably comprises a pair of oppositely extending metallic switch fingers 11—11 clamped between a top plate 12 and a bottom plate 13 but insulated therefrom by insulators 14—14. The top and bottom plates 12 and 13 are provided with holes in which fits a pivot pin 15 depending from the base plate 8 and the switch fingers 11 are provided with a large hole 16 around the pivot pin 15 so that the switch fingers 11—11 do not contact or engage with the metal pivot pin 15. Between the bottom plate 13 and the casing 10′ and fitting around the pivot pin 15 is a washer 17 preferably of insulating material, and between the top plate 12 and the base plate 8 and fitting around the spindle 15 is another washer 18 preferably of insulating material. In this way the fingers 11—11 are completely insulated from the pivot pin 15 and from the metal base plate 8. In Fig. 2 the switch is shown as closed; that is to say, as completing the electric circuit to the motor. In this position, the oppositely extending switch fingers 11—11 engage stationary contacts 19, 20 rigidly secured to the bottom of the casing 10′ and having extensions 19′—20′ extending through the casing for attachment to the electric leads or wires 21 and 22. The casing 10′ is of insulating material and the extensions 19′—20′ may be permanently imbedded therein. When the switch member (comprising the fingers 11, the top plate 12, the bottom plate 13, and the insulators 14) is turned on its pivot pin 15 through a relatively small angle, the switch fingers 11—11 move out of engagement with the stationary contacts 19, 20 thereby breaking the electric circuit to the driving motor (not shown). The top plate 12 is provided with an arm 23 extending upwardly through an arc-shaped slot 24 in the base plate 8 and the top end of said arm 23 loosely fits in a suitable opening 25 in the stop member 26. A switch of this type is described and shown in the U. S. patent to Murray, No. 1,229,642, patented June 12, 1917.

The stop member 26 is pivotally mounted on the base plate 8 on a pivot pin or stud 27, and mounted upon and carried by said stop member is an abutment member 28. In the embodiment of our invention as shown in Figs. 1 to 3, this abutment member 28 is mounted upon a pivot pin 29 tightly secured to the stop member 26. To said abutment member is rigidly connected the handle 30.

Mounted to oscillate about the axis of a stud 31, stationarily mounted on the base plate 8, is a detent 32 extending from said pivot or stud 31 toward said abutment member 28. This detent 32 is arranged to have but slight angular movement about the axis of the stud 31, said angular movement being limited by the upper stop pin 33 on the one side, and the lower stop pin 34 on the other side. Also mounted to oscillate about the axis of the stud 31 is a radially extending arm 35 terminating in a bifurcated end forming two fingers 36 and 37. The inner side of one finger (36) is arranged to be engaged and actuated by the lower end of a vertical stud 38 which is rigidly secured at its upper end to the under side of a swinging tone arm (not shown), while the other finger 37 is preferably provided with an upwardly extending handle 39 for the convenient manual operation or adjustment of the arm 35. The bifurcated arm 35 and the detent 32 are preferably directly mounted on a sleeve 40 which is freely rotatable on the stud 31. Said rotatable sleeve 40 is provided with a flange 40ᵃ slightly spaced from and out of contact with the base plate 8 by a washer 40ᵇ. Between the arm 35 and the flange 40ᵃ and between said detent 32 and the adjustable arm 35 are friction washers 41. The detent 32 the adjustable arm 35 and the friction washers 41 are all yieldingly held pressed together on the sleeve 40 by a spring washer 42 having a radial slot 42ᵃ therein, the sides of which fit with a circumferential groove or slot 40ᶜ in the sleeve 40.

By reason of the construction the detent 32, the adjustable arm 35, the sleeve 40, friction washers 41—41 and spring washer 42 all freely move together as one piece on the stud 31, within the limits of the oscillation of the detent 32 (the oscillating movement of the detent 32 being limited by the stop pins 33 and 34), but by overcoming the frictional resistance between the washers 41 and the parts engaged thereby, the arm 35 may be readily angularly adjusted with respect to the detent 32 for the purpose of setting the finger 36 in the proper position for engagement by the stud 38 at the end of the reproduction of sound from a particular record. A detent, an adjustable bifurcated arm with the frictional washers therebetween and the relation thereof to a pin depending from the tone arm are also clearly shown and described in the said U. S. Patent No. 1,229,642, and a further description of the construction thereof herein is not deemed necessary for an understanding of the present invention. The detent 32 is preferably provided with an upwardly extending rigid stud 43 and the stop member 26 is also preferably provided with a similar upturned rigid stud or pin 44 and to the ends of said studs or pins 43, 44 are preferably respectively attached the opposite ends of a coil spring 45.

The abutment member 28 preferably comprises an arm, projection or abutment 46 extending substantially away from the axis of the pivot pin 29 and substantially toward the axis of the stud 31 upon which the detent 32 is pivoted. The end of the arm or projection 46 is preferably provided with a transverse flat surface 47 normal to a line drawn thereto from the axis of the pivot pin 29; with a sharp corner or edge 48, and a curved arc-shaped upper surface 49 substantially concentric with the axis of the pin 27 around which the stop member 26 moves. The end of the detent 32 is also preferably provided with a transverse flat surface 50 which, when the parts are in the position shown in Fig. 1, squarely fits against the flat surface 47 of the arm or abutment 46. The detent 32 is also preferably provided with a sharp edge or corner 51 at the lower end or side of the said flat surface 50. These surfaces are more clearly indicated in Fig. 4.

The position of the studs 43 and 44 is such that when the device is set in the nonstopping position (as shown in Fig. 1) the tension of the spring 45 will lightly hold the detent 32 against the lower stop pin 34.

The manner in which the coacting surfaces of the detent 32 and abutment member 28 cooperate in the operation of the device will be fully explained below.

The stop member 26 is also preferably provided with an upwardly projecting rigid stud 52 which serves as a stop to limit the rotational movement of the abutment member 28 and its handle 30 in a clockwise direction with respect to the stop member 26.

The base plate 8 is preferably also provided with two upwardly extending stoppins or studs 53 and 54 which serve to limit the movement of the handle or lever 30 and hence of the stop member 26 beyond a predetermined point in either direction.

The operation of the device, so far as has been above described, is as follows:

Assuming the adjustable arm 35 to have been so set with respect to the detent 32 that when the pin 38 carried by the tone arm engages the finger 36 of the arm 35 the reproducer will be at the end of the reproduction of sound of a particular record on the turntable, that the lever 30 has been swung to the "on" position (herein referred to as the non-stopping position) shown in Fig. 1, and that the flat surface 47 on abutment member 28 is held against the flat surface 50 of the detent 32 by the tension of the spring 45, and assuming further that when the parts are in this position, the switch fingers 11, 11 are in engagement with the stationary contacts 19, 20, thus closing the circuit through the wires 21 and 22 to the electric motor by means of which the spindle 3 is rotated, the parts will thereafter normally remain in this position until the pin 38 engages the arm 36 as the tone arm swings over the record during the reproduction of sound therefrom. When the pin 38 engages the finger or arm 36 it will swing the arm 35, and with it the detent 32, in an anticlockwise direction around the pivot 31, thus transversely sliding the flat surface 50 of the detent over the flat surface 47 of the arm or abutment 28 until the sharp corner or edge 51 reaches the sharp corner or edge 48 of the forwardly projecting arm 46. During this part of its movement the small flat surface 50 of the detent 32 merely slides transversely over the small flat surface 47 of the abutment without forcing the abutment member or the stop member away from each other, because these flat surfaces 47 and 50 lie substantially in a plane at right angles to a line connecting the axis of the stud 29 with the axis of the stud 31. These two surfaces offer then no resistance to the movement of the parts with respect to each other, other than the small frictional resistance due to the tension of the spring 45 which holds these surfaces together. This friction is, however, so small that there is substantially no appreciable wear thereon. When the sharp edge 51 slides beyond or clears the sharp corner 48 on the abutment, the spring 45 is free to act, and it immediately pulls the sharp corner 48 under the sharp edge or corner 51 of the detent and turns the stop member 26 and the parts mounted thereon around its pivot 27. It is to be noted that substantially the full contractive force of the spring 45 is operative to turn the stop member 26, and the parts carried thereby, about the axis of the pivot pin 27. It therefore acts quickly, and snaps the member 26 into "stopping position" in which the handle 30 bears against the stop pin 53. In this position the handle 30 is substantially held between the two stops 53 and 52. During this movement to stopping position, the stop member also quickly swings the upwardly extending arm 23 of the switch 10 to the other end of the arc-shaped slot 24 in the base plate 8, and this movement of this arm 23 swings the switch member (comprising the top plate 12, switch fingers 11—11, the bottom plate 13 and the insulators 14 therebetween) around the axis of the pivot pin 15 and throws the fingers 11, 11 out of engagement with the stationary contacts 19 and 20 with the result that the circuit through the leads or wires 21, 22 is broken.

After such an operation of the device, the tone arm may be manually swung in the opposite direction, a new record may be put upon the machine, the arm 36 may again be adjusted by the handle 39 on the arm 37 so that when the tone arm is in the last few convolutions of that sound record the pin 38 will re-engage the arm 36, and the stopping mechanism is then ready to be reset. To do this, the tone arm is again swung to the outside or the periphery of the record, and the handle 30 is manually grasped and swung in a clockwise direction. During this movement the lever 30 and stop member 26 move as one, until the sharp edge 51 of the detent 32 reaches the sharp corner or edge 48 of the abutment. The tension of the coiled spring 45 is such as to hold the under side of the detent 32 against the arc-shaped top surface 49 of the arm 46, and as the motion of the arm 30 is continued, the sharp corner or edge 48 will reach the sharp edge 51 of the detent. As soon as the sharp edges 48 and 51 are clear of each other, the two flat surfaces 47 and 50 of the abutment member 28 and the detent 32 respectively will also be clear of each other, whereupon the spring 45 will draw the detent down against the stop pin 34. This motion of the arm 30 in a clockwise direction similarly moves the switch back to a position wherein the switch fingers 11, 11 again will engage the stationary contacts 19, 20, thus establishing the circuit to the motor which immediately begins to rotate the turntable. When the handle 30 is now released by the operator, the spring 45 will turn the stop member and parts carried thereby through a slight angle, until the said flat surface 47 of the abutment rests again squarely against the flat surface 50 of the detent.

The above operations are those which are performed when the stop device is operated automatically by the tone arm, when the device is adjusted and set to stop the machine at the completion of the reproduction of sound from a sound record on the turntable.

But it is sometimes desirable to stop the reproduction of sound in the middle of the record, before the pin 38 shall engage the arm 36 at the completion of the reproduction of sound from the record, and this may be accomplished in this device by lightly touching the lever 30 by the finger of the operator to move it in an anticlockwise direction. By reason of the fact that the flat surfaces 47 and 50 lie, as above referred to, substantially in a plane normal to a line connecting the axes of the studs 29 and 31, this movement of the handle 30 in an anti-clockwise direction is effected without substantial resistance or wear between the two surfaces, and when the abutment member or arm has been so turned with respect to the stop member 26 that the sharp corner or edge 48 reaches the sharp edge or corner 51 of the detent, the spring 45 then becomes operative to draw the arm or projection 46 under the detent until the spring 45 brings the handle 30 carried by the abutment member squarely against the stop pin 53. In this way the manual application of a slight pressure against the side of the handle 30 to move it in an anticlockwise direction, causes a relative movement of the two flat surfaces 47 and 50 and that without substantial resistance to release the stop member 26 from the detent 32. By providing the arm or extension 46 with the arc-shaped upper surface 49 permits the said arm to slide freely under the end of the detent as soon as the sharp edge 51 of the detent clears the sharp edge or corner 48 of the arm 46.

But when a talking machine is driven by an electric motor there is always a likelihood that through inadvertence or carelessness the current is not turned off after one has finished using the machine for the purpose of reproducing sound. The sound box might be lifted so that the pin 38 would not be operative to engage the arm or finger 36 to release the stop member 26 or a record might be taken off the machine while the turntable was rotating, with the result that the motor would continue to run indefinitely, that is to say, so long as the electric circuit thereof remains closed. It is therefore desirable that electrically driven machines be provided with a device which will operate to break the circuit supplying current to the motor within a reasonable time after the machine has been left running, such time being, however, much longer than that required to complete the reproduction of sound from the longest record. To accomplish this, the device shown in Figs. 1 and 2 is provided with a further mechanism for stopping the rotation of the turntable after the lapse of a relatively long period of time; e. g., after the machine has been left running for ten minutes. Such mechanism is as follows:

The turntable spindle 3 is preferably provided with a worm 55 adapted to drive a worm gear 56 rigidly connected to a shaft 57 suitably journaled in bearings 58, 59 depending downwardly from a base plate 60 secured in any suitable manner to the underside of the motor board 1. Said shaft also is provided with a worm 61 adapted to engage and drive a worm gear 62 rigidly secured to a shaft 63 mounted in a bearing 64 also depending from the base plate 60. The opposite end of said shaft 63 is preferably provided with a worm 65 adapted to engage and drive a worm gear 66 mounted at the lower end of a vertical shaft 67 suitably journaled in a bearing 68 also carried by the base plate 60. Said vertical shaft 67 preferably passes upwardly through a suitable opening 69 in the motor board and through an opening 70 in the base plate 8, and above the base plate 8 the upper end of the shaft 67 is preferably provided with a ratchet wheel 71, provided with a plurality of ratchet teeth 72. The arrangement of gearing above described is such that when the turntable spindle 3 rotates in reproducing sound from a talking machine record of the ordinary disc type, the ratchet wheel 72 will slowly rotate in an anticlockwise direction. It will be apparent from a mere inspection of the system of gearing above described, wherein in each speed reduction a worm is employed to rotate a worm wheel, that a relatively large number of rotations of the turntable spindle will rotate the ratchet wheel 71 through a relatively small angle.

The abutment member 28 is further provided with a pivot pin or stud 73 on which is pivotally mounted one end of a link 74, the opposite end of said link being provided with a pawl 75 pivoted thereto on a pivot pin 76, said pawl being arranged to lie in the plane of the ratchet wheel 71. This pawl 75 is preferably provided with two stop or limit pins 77 and 78, by means of which the angular movement of the pawl 75 with respect to the link 74 is limited, the pin 77 serving to limit the movement of the pawl about its pivot pin 76 in a clockwise direction by reason of the engagement of the said pin 77 with the end of the link 74, and the pin 78 serving to limit the movement of the pawl 75 in an anti-clockwise direction around its pivot pin 76 by reason of the engagement of said pin 78 with the underside of the end of the link 74.

A coiled spring 79 having one end attached to said pawl 75, preferably to the pin 78 thereof, and its other end attached to a pin or stud 80 rigidly mounted on and extending upwardly from the base plate 8, serves to normally hold the pawl 75 in the notches between the ratchet teeth 72 of the ratchet wheel 71 and tends to hold the stop pin 78 against the underside of the link 74.

Between the ends of the link 74 there is provided a cam projection 81 having an inversely curved face. The base plate 8 is preferably provided with a rigid stationary preferably cylindrical stud 82 arranged to be engaged by the curved surface of said cam projection 81 to throw the pawl 75 out of engagement with the ratchet 71 upon the release of the stop member 26 as will be again referred to below. The stop member 26 is preferably provided with another rigid stud 26ª to form a limit to the anti-clockwise movement of the abutment member 28 with respect to the stop member 26.

In the position of the device shown in Fig. 1, it may be assumed, for the purpose of explaining the operation of the structure last above described, that for some reason or other, the pin 38 depending from the tone arm has not and will not engage the arm 36 to lift the detent 32 to release the stop member 26, and it may also be assumed that the ratchet 71, against which the pawl 75 has been held by the spring 79, has turned the pawl 75 with respect to the link 74 until the stud 77 has just engaged the end of the link 74. With these premises it will be plain that the further rotation of the ratchet 71 in an anti-clockwise direction will slowly move the link 74 to the right, thus turning the abutment member 28 on its pivot 29 and sliding the flat surface 47 of the abutment member 28 over the co-acting flat surface 50 of the end of the detent 32. This sliding movement will continue until the sharp corner or edge 48 reaches the sharp corner 51 on the detent, whereupon the spring 45 will act to quickly slide the abutment under the sharp edge of the detent to release the stop member 26, and then snap the stop member into stopping position.

This quick movement of the stop member 26, in coming to stopping position pulls the link 74 longitudinally to the right and as soon as the stop member 26 begins to so move it also draws the inversely curved surface of the cam projection 81 against the cylindrical surface of the stud 82. As the cam 81 slides under the stud 82 the link 74 is forced downwardly against the tension of the spring 79 and the end of the pawl 75 is freed from engagement with the teeth 72 of the ratchet wheel 71, whereupon the spring 79 then turns the pawl 75 on its pivot pin 76 until the stop pin 78 engages the underside of the link 74. In other words, when the end of the pawl 75 is thus thrown out of engagement with the ratchet teeth 72, the ratchet engaging end thereof is thrown rearwardly with respect to the direction of the motion of the ratchet wheel 71 so that when the handle 30 is thrown in a clockwise direction to reset the device and the link 74 is moved therewith to the left— back to the position shown in Fig. 1—the end of the pawl 75 will not re-engage the same ratchet tooth that it did just prior to the time when it was thrown out of engagement with the ratchet by the cam 71 and stud 70, but it will engage some ratchet tooth in the rear thereof.

Since the angular movement of the ratchet is very slow, as above described, and since on substantially every movement of the stop member 26 to stopping position the pawl 75 is thrown out of engagement with the ratchet 71 and to such a position that it will not re-engage the same tooth, but a tooth in the rear thereof, it will be plain that this last described stopping mechanism will never operate to release the stop member 26 unless the machine continues to run for a much longer time than is required to reproduce the sound from any record, and then only when the depending pin 38 has failed to engage the arm or finger 36 or when the machine has been left running with the sound box raised and the needle out of engagement with the talking machine record.

In Figs. 5 and 6 we have shown a modified form of device, particularly adapted as a stop mechanism for talking machines which are driven by a spring motor, and wherein the stop member carries a brake pad which, upon the release of the stop member, is brought against the periphery of the turntable to stop the further rotation of the talking machine motor, or against some other part of the operating mechanism.

In this embodiment of our invention, the base plate 8' may be secured by suitable screws passing through screw holes 9, 9 to the motor board 1 and the turntable 4 with its peripheral flange 5 and friction surface 6 which carries the record 7, overlies and covers the stop mechanism, as in the first above described construction.

The stop member 26' is pivoted upon a stationary pivot pin 27 rigidly secured to the base plate 8' and the abutment member 28' is preferably pivoted on a pivot pin 29 rigidly secured to the stop member 26'. The abutment member 28' is provided with a handle 30 as in the previously described embodiment of our device. The detent 32 is mounted to oscillate slightly around the axis of the stud 31 rigidly secured to the base plate 8' between an upper stop pin 33 struck upwardly from the base plate 8' and a lower stop pin 34', shown in this form of our device as also struck up from the base plate 8'.

The adjustable bifurcated arm 35 with its finger 36 arranged to cooperate with the stud or pin 38 on the tone arm and with the finger 37 provided with a handle 39 are all similar or the same as has been shown and described in connection with the modification shown in Figs. 1 and 2, but the frictional connection between the arm 35 and the detent 32 is somewhat simplified. The sleeve 40' on the stud 31 is provided with a lower flange 40$^{a'}$ permanently secured thereto in any suitable manner, as by riveting, and serves to slightly space the hub on the adjustable arm 35 and the base plate 8'. The sleeve 40' is also provided on its upper end with a head or flange 40$^d$ between which and the detent is secured a spring washer 42', the action of which is to tightly hold the hub of the detent 32 in frictional engagement with the hub of the adjustable arm 35. This construction is clearly illustrated in Figs. 5 and 6.

The detent 32 is provided with an upwardly extending rigid stud or pin 43 and the stop member 26' is provided with a rigid stud or projection 44' to which the opposite ends of coiled spring 45 are attached respectively. The abutment member 28' is provided with an arm or abutment 46' having a flat transverse surface 47, a sharp edge 48 and an upper arc-shaped surface 49, all of which is adapted to cooperate with the flat surface 50 and sharp corner 51 on the detent as above set forth in connection with the first above described embodiment of our invention.

The stop member 26' is also provided with a stop 52 with which the handle 30 engages when the latter is swung in a clockwise direction to set the mechanism. The angular movement of the stop member 26' about the axis of its pivot 27 is limited by stop pins 53' and 54' struck up from the base plate 8' and arranged in the path of movement of the stop member 26' in lieu of the stop pins 53 and 54 with which the handle 30 engages, to limit the movement of the stop member 26 of the modification previously described.

The stop member 26' is provided with an upturned portion 83 within which is securely fastened a brake pad 84 adapted, when the stop member is released, to come into braking engagement with the inner side of the depending flange 5 of the turntable, or with some other moving part of the machine.

Except for the fact that this device is operative to apply a brake to the turntable of a talking machine, and the fact that the mechanism for moving the abutment member when the motor has been inadvertently left running is omitted, the device operates exactly as does the device first above described.

When the depending pin 38 engages the finger 36 and slightly rocks or turns the adjustable arm 35 and with it the detent 32, the flat surface 50 slides, without substantial resistance, over the flat surface 47 until the sharp edge or corner 51 of the detent clears the sharp corner 48 of the abutment member, and then the spring 45 turns the stop member 26' about the pivot pin 27 to bring the brake pad 84 against the flange 5 of the turntable. When for any reason during the reproduction of sound from a record, and before the depending stud 38 engages the arm 36, it is desirable to stop the motor, the handle 30 may be manually pressed in an anti-clockwise direction to move the flat surface 47 of the abutment over the flat surface 50 of the detent until the sharp corner edge 48 clears the sharp corner 51 of the detent, whereupon the spring 45 comes into operation and swings the stop member 26' to the position wherein the brake pad 84 engages the flange 5.

The resetting of the device is accomplished by moving the handle 30 in a clockwise direction. The handle 30 by reason of its engagement with the stop 52, turns the stop member 26' and the abutment member 28' together as one, around the axis of the pin 27 in a clockwise direction, the curved surface 49 of the abutment sliding under the end of the detent 32 until the sharp corner 48 clears the sharp edge 51 on the detent whereupon the spring 45 turns the detent 32 on the axis of the stud 31 and brings it against the lower stop pin 34' carried by the plate, the flat surface 47 of the abutment and the flat surface 50 of the detent being clear of each other. The release at this time of the handle 30 leaves the coiled spring 45 free to bring said flat surfaces 47 and 50 into engagement with each other. This operation is exactly like that of the device first above described. In thus bringing the stop member 26' into this non-stopping position, the brake pad 84 is moved out of engagement with the flange 5 on the turntable 4, and is held in the position shown in Fig. 4 until released either by the movement of the bifurcated arm 35, or the anti-clockwise manual movement of the handle 30.

In both of the forms or embodiments of our invention, as above disclosed and described, the abutment member is a movable one, preferably pivoted to the stop member in such a way as to permit of its movement relative to the stop member, but it is to be understood that the construction and arrangement of these parts may be varied considerably without departing from the spirit and scope of our invention.

It will also be clear that we have provided a mechanism wherein the disengagement of the abutment member with the detent, when the mechanism is in non-stopping position, may be effected in three ways to stop a talking machine; (1) by the engagement of a projection on the tone arm with the adjustable member frictionally connected to the detent to automatically move the detent out of engagement with the abutment, to allow the spring to throw the stop member from non-stopping to stopping position; (2) by the manual movement of the handle to move the abutment out of engagement with the end of the detent, so that the spring may throw the stop member from non-stopping to stopping position; and (3) by a time stop mechanism operative to automatically move the abutment out of engagement with the end of the detent, to allow the spring to throw the stop member from non-stopping to stopping position. It will be observed that in these three ways of actuating the stopping mechanism, the detent and the abutment, by the engagement of which the stop member is maintained in non-stopping position, are held together and are so moved with respect to each other that there is substantially no wear between the coacting parts, with the result that after long and continued use the device may be re-set as accurately as when it was operated for the first time. The construction is such, however, that if there were a wear on the coacting surfaces of the abutment and detent, that wear would not substantially change the length of the flat co-operating surfaces and would therefore not vary the time within which the end of the detent is in engagement with the end of the abutment, after the detent begins to move and up to the point when the sharp edge of the detent reaches the sharp corner of the abutment, and therefore a substantial wear of the said flat surfaces would not affect the accuracy with which the device could be set to operate.

Our construction is such that there is no jamming of the parts with respect to each other to release the stop member, because the movement between the detent and abutment is merely a sliding movement of one flat surface against the other, without any tendency to move the stop member during such sliding movement, and because the friction between the detent and abutment is only that produced by the comparative light pressure with which the coil spring presses the small flat surface of the abutment against the small flat surface of the detent.

There is substantially no resistance to be overcome in sliding the detent out of engagement with the abutment, or in sliding the abutment out of engagement with the detent except that due to the slight friction between the said flat surface on the detent and the coacting flat surface on the abutment.

In the above construction the length of time required for the tripping or releasing action to be performed, after the detent or the abutment has once begun to move automatically, the one with respect to the other, will depend a great deal on the distance that one of said members is required to move or slide over the flat surface of the other. Since the movement of the tone arm and of the ratchet is relatively slow, the extent to which said flat surfaces overlap and are in actual contact with each other when the device is set in "non-stopping" position is preferably made very small, so that one member may move out of engagement with the other member in the time required for a stylus to traverse two or three convolutions of a record groove. By thus making the extent to which the flat surfaces on said members overlap, relatively small and by providing a construction wherein the wear on those surfaces is negligible, the device may be very accurately and delicately adjusted to actuate the stop device at an exact predetermined or selected point in the record groove.

Having thus described our invention, what we claim and desire to protect by Letters Patent is:

1. In a stop mechanism the combination of a stop member movable into stopping and into non-stopping positions, an abutment member mounted on said stop member and movable with respect thereto, a detent for holding said stop member in non-stopping position, yielding means tending to move said stop member into stopping position and holding said abutment against said detent when said stop member is in non-stopping position, and means to move said abutment member with respect to said detent out of engagement with said detent to release said stop member, whereby said yielding means moves said stop member into stopping position.

2. In a stop mechanism the combination of a stop member movable into stopping and into non-stopping positions, an abutment member mounted on said stop member and movable with respect thereto, a detent for holding said stop member in non-stopping position, yielding means tending to move said stop member into stopping position and holding said abutment member against said detent when said stop member is in non-stopping position, and means to move said abutment member with respect to said detent and with respect to said stop member to release said stop member, whereby said yielding means moves said stop member into stopping position.

3. In a stop mechanism the combination of a stop member movable into stopping and non-stopping positions, an abutment member mounted on and movable with respect to said stop member, a detent for holding said stop member in non-stopping position, yielding means tending to move said stop member into stopping position and holding said abutment member against said detent when said stop member is in non-stopping position, and means to automatically move said abutment member with respect to said stop member and said detent to disengage said detent and said abutment member.

4. In a stop mechanism the combination of a stop member movable into stopping and non-stopping positions, a pivoted member mounted on said stop member, a detent for holding said stop member in non-stopping position, yielding means tending to move said stop member into stopping position and holding said pivoted member against said detent when said stop member is in non-stopping position, and means to automatically move said pivoted member to disengage said pivoted member and said detent to release said stop member, whereby said yielding means throws said stop member to stopping position.

5. In a stop mechanism the combination of a stop member movable into stopping and into non-stopping positions, a movable member mounted on said stop member and having an abutment, a detent for retaining said stop member in non-stopping position, yielding means tending to move said stop member into stopping position and holding said abutment against said detent when said stop member is in non-stopping position, and means independent of said detent to automatically move said movable member with respect to said detent to disengage said abutment from said detent.

6. In a stop mechanism, the combination of a stop member movable into stopping and into non-stopping positions, yielding means tending to hold said member in stopping position, a detent, an abutment member mounted on said stop member and movable with respect thereto and having a projection arranged to be held against said detent by said yielding means to retain said stop member in non-stopping position, and means to manually move said abutment member to disengage said projection from said detent.

7. In a stopping mechanism the combination of a stop member movable into stopping and non-stopping positions, an abutment member carried by said stop member and movable with respect thereto, a detent for holding said stop member in non-stopping position, yielding means tending to move said stop member into stopping position and holding said abutment member against said detent when said stop member is in non-stopping position, automatic means to disengage said detent and said abutment, whereby said yielding means automatically moves said stop member into stopping position, and means carried by said abutment member by the manual movement of which in one direction said stop member is released from said detent and in the other direction said stop member is moved into non-stopping position and said abutment member is brought into reengagement with said detent.

8. In a stop mechanism, the combination of a stop member movable into stopping and into non-stopping positions, a spring tending to hold said member in stopping position, a pivoted detent, a pivoted member mounted on said stop member and having an arm extending outwardly away from the axis of said pivoted member and generally toward the pivot of said detent, the end of said arm being arranged to be held by said spring against the end of said detent to hold said stop member set in non-stopping position, the engaging surfaces of said arm and detent being flat and disposed substantially in a plane disposed at right angles to a line connecting the pivotal axes of said arm and detent, and means to disengage said detent and said arm whereby said spring moves said stop member into stopping position.

9. In a stop mechanism, the combination of a stop member movable into stopping and into non-stopping positions, a spring tending to hold said member in stopping position, a pivoted detent, a pivoted member having an arm extending outwardly away from the axis of the pivot of said pivoted member and generally toward the pivot of said detent, the end of said arm being arranged to be held by said spring against the end of said detent to hold said stopping member set in non-stopping position, means to automatically move said detent out of engagement with said arm to release said stop member, and means to automatically move said arm out of engagement with said detent to release said stop member.

10. In a stop mechanism, the combination of a stop member movable into stopping and into non-stopping positions, a spring tending to hold said member in stopping position, a pivoted detent, a pivoted member having an arm extending outwardly away from the axis of the pivot of said pivoted member and generally toward the pivot of said detent, the end of said arm being arranged to be held by said spring against the end of said detent to hold said stopping member set in non-stopping position, means to automatically move said detent out of engagement with said arm to release said stop member, and means to manually move said arm with respect to said stop member and out of engagement with said detent to release said stop member.

11. In a stop mechanism, the combination of a stop member movable into stopping and into non-stopping positions, a spring tending to hold said member in stopping position, a detent, a pivoted member mounted on said stop member and providing an abutment arranged to be held against said detent by said spring to hold said stop member in non-stopping position, and manually operable means connected to said pivoted member and movable in one direction to move said abutment out of engagement with said detent to release said stop member, and movable in the other direction to move said stop member into non-stopping position and said abutment into holding engagement with said detent.

12. In a stop mechanism, the combination of a spring, a stop member movable into stopping and into non-stopping positions and normally held in stopping position by said spring, a movable member mounted on said stop member and providing an abutment, a detent against which said abutment is held by said spring when said stop member is in non-stopping position, means to automatically disengage said detent and said abutment to release said stop member whereby said spring moves said stop member to stopping position, and manual means movable in one direction to disengage said detent and said abutment to release said stop member and in the opposite direction to move said stop member into non-stopping position and said abutment into engagement with said detent.

13. In a stop mechanism, the combination of a stop member movable into stopping and into non-stopping positions, a spring tending to move said member into stopping position, a detent, and a manually operable member mounted on said stop member to be moved relatively thereto and providing an abutment arranged to engage said detent when said stop member is in non-stopping position, the movement of said manually movable member in one direction being operative to disengage said abutment from said detent to release said stop member and in the opposite direction to move said stop member into non-stopping position and said abutment into holding relation with respect to said detent.

14. In a stop mechanism, the combination of a stop member movable into stopping and into non-stopping positions, a spring tending to move said member into stopping position, a detent, a member movable with respect to and permanently mounted on said stop member and providing an abutment for engagement with said detent when said stop member is in non-stopping position, automatic means to move said detent out of engagement with said abutment to release said stop member, automatic means to move said movable member with respect to said stop member and said abutment out of engagement with said detent to release said stop member, and manual means to move said movable member with respect to said stop member to disengage said abutment from said detent to release said stop member.

15. In a stop mechanism, the combination of a stop member movable into stopping and into non-stopping positions, a spring tending to move said member into stopping position, a detent, a member permanently mounted on said stop member and movable with respect to and providing an abutment for engagement with said detent to retain said stop member in non-stopping position, automatic means to move said detent out of engagement with said abutment to release said stop member, automatic means to move said movable member with respect to said stop member and said abutment out of engagement with said detent to release said stop member, and means manually movable in one direction to move said movable member with respect to said stop member and said abutment out of engagement with said detent to release said stop member and in the opposite direction to move said stop member into non-stopping position and said abutment into engagement with said detent.

16. In a stop mechanism, the combination of a stop member, movable into stopping and into non-stopping positions, a spring tending to hold said member in stopping position, a detent, said stop member being provided with an abutment adapted to be held against said detent by said spring to hold said stop member in non-stopping position, and means to slide said abutment transversely over and out of engagement with said detent to release said stop member and render said spring operative to move said stop member to stopping position.

17. In a stop mechanism, the combination of a stop member movable into stopping and into non-stopping positions, a spring tending to hold said member in stopping position, a detent, said stop member being provided with an abutment arranged to be held against said detent by said spring to hold said member in non-stopping position, one of the surfaces on which said detent and said abutment engage being substantially flat and disposed in a plane normal to a line drawn from said surface to the pivot of said detent, and means to slide the engaging surface of said abutment substantially in the plane of said surface, means to slide the detent engaging portion of said abutment in the plane of said surface over and out of engagement with said detent to release said stop member from non-stopping position.

18. In a stop mechanism, the combination of a stop member movable into stopping and non-stopping positions, a detent, an abutment on said stop member having end-to-end engagement with said detent to retain said stop member in non-stopping position, means tending to move said stop member into stopping position, and means to disengage said abutment and said detent by transverse movement of either relative to the other.

19. In a stop mechanism, the combination of a stop member movable into stopping and non-stopping positions, an abutment thereon, a detent having end-to-end engagement with said abutment to retain said stop member in non-stopping position, means tending to move said stop member into stopping position, and means to disengage said detent and said abutment by transverse movement of either relative to the other.

In witness whereof, we have hereunto set our hands this 25th day of August, A. D. 1922.

FREDERIC S. CALDERWOOD.
RUDOLPH E. ZERUNEITH.